Figure 1:
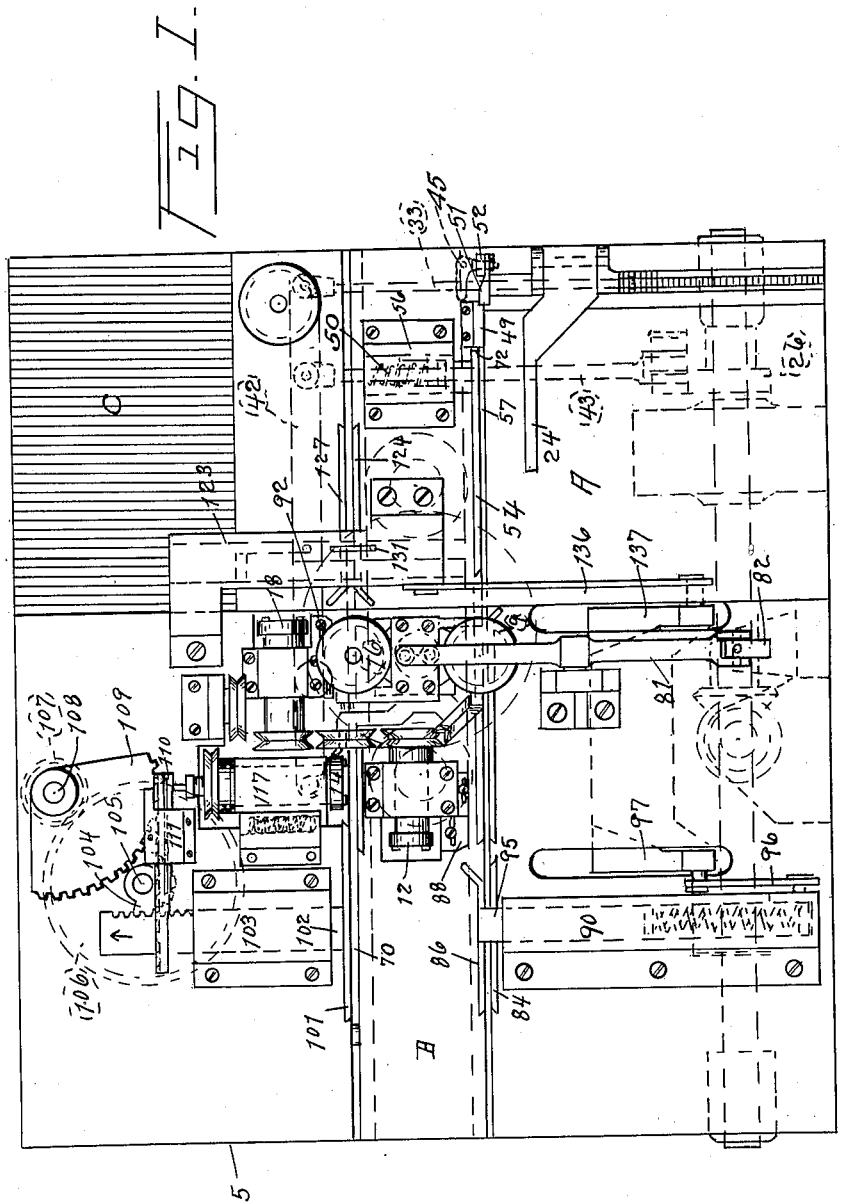

May 23, 1933.  C. W. CURLE  1,910,524
TYPE SLUG TRIMMING DEVICE
Filed May 12, 1930   10 Sheets-Sheet 1

INVENTOR.
C. W. CURLE
BY C. L. Drew
ATTORNEY.

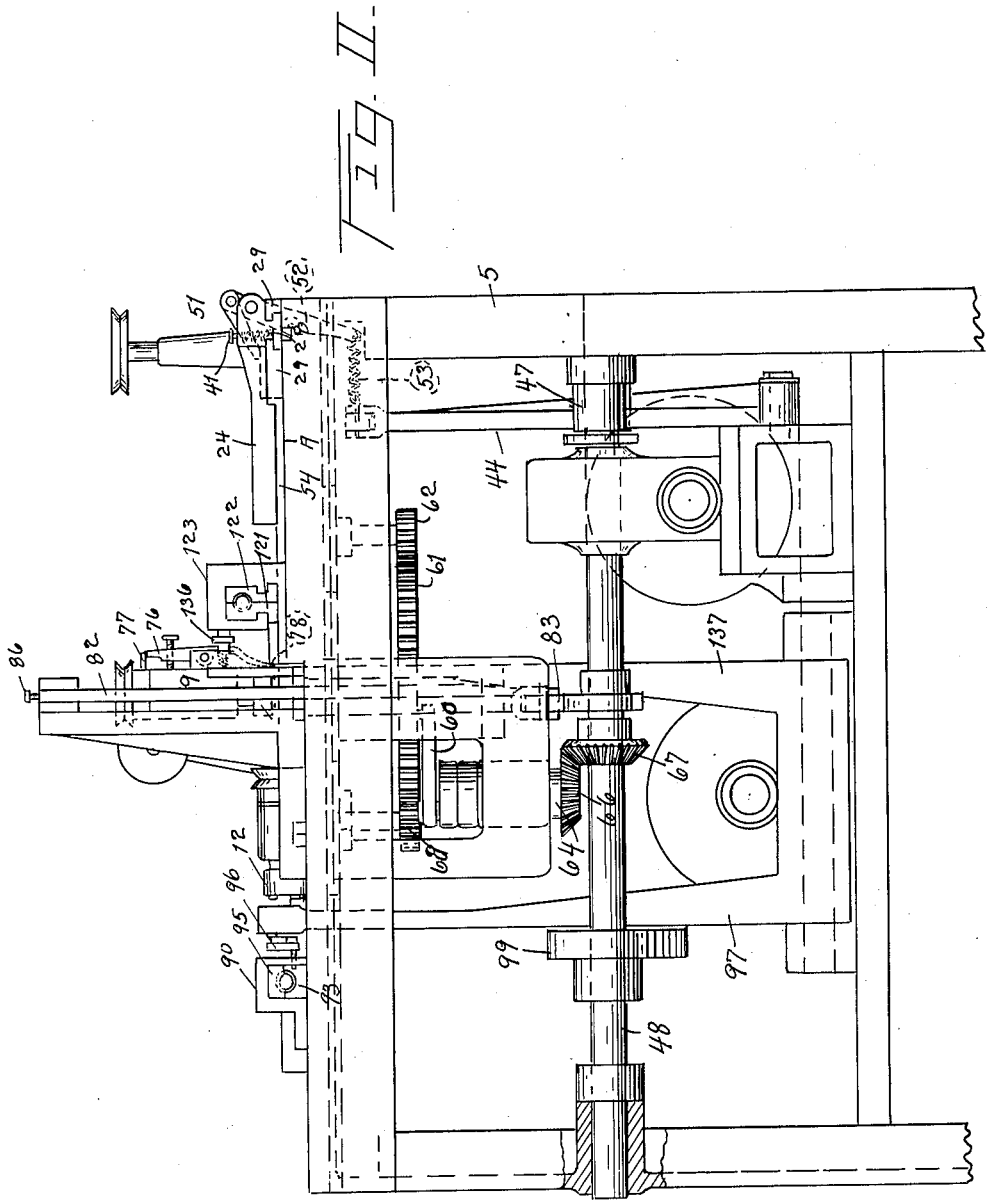

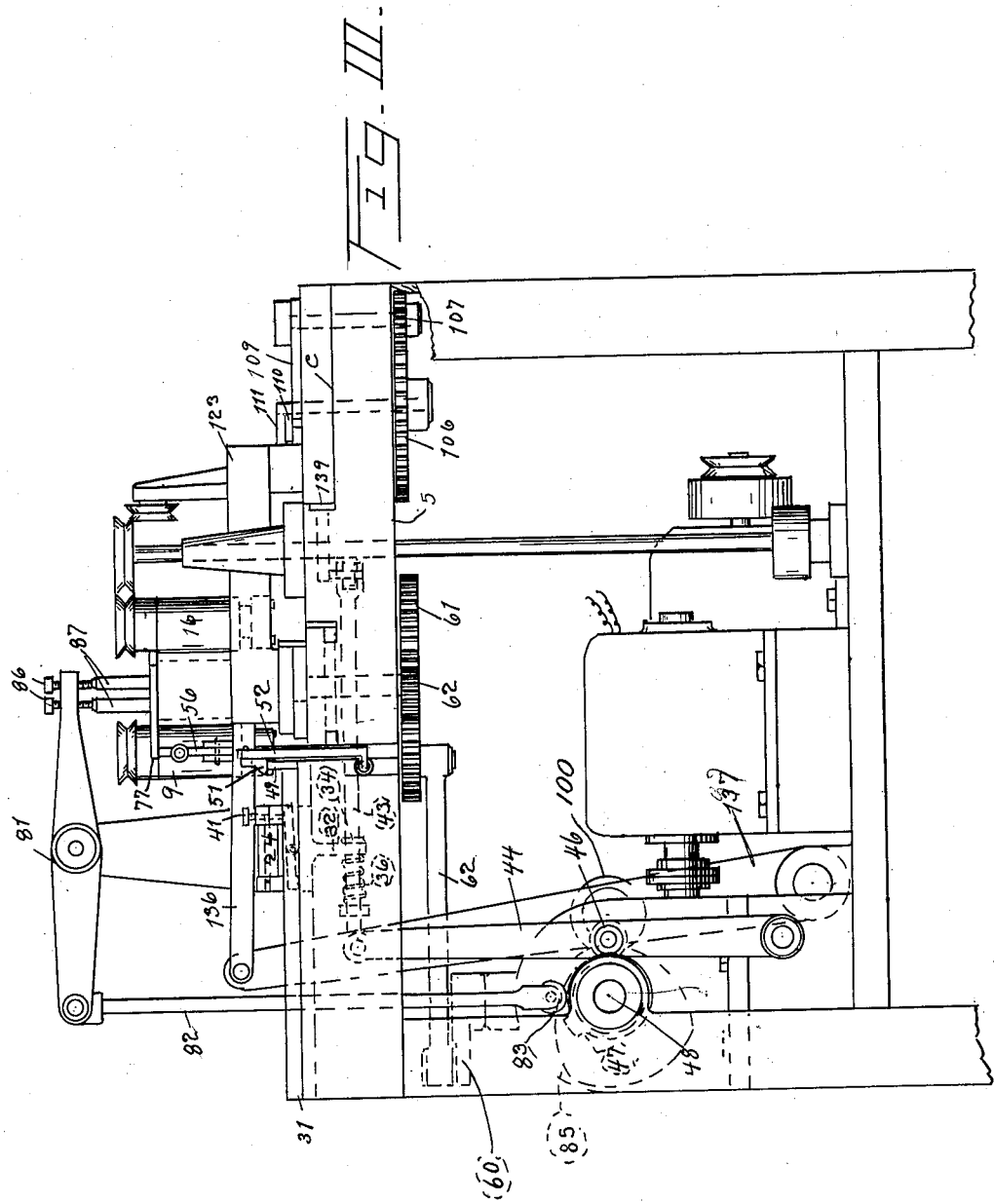

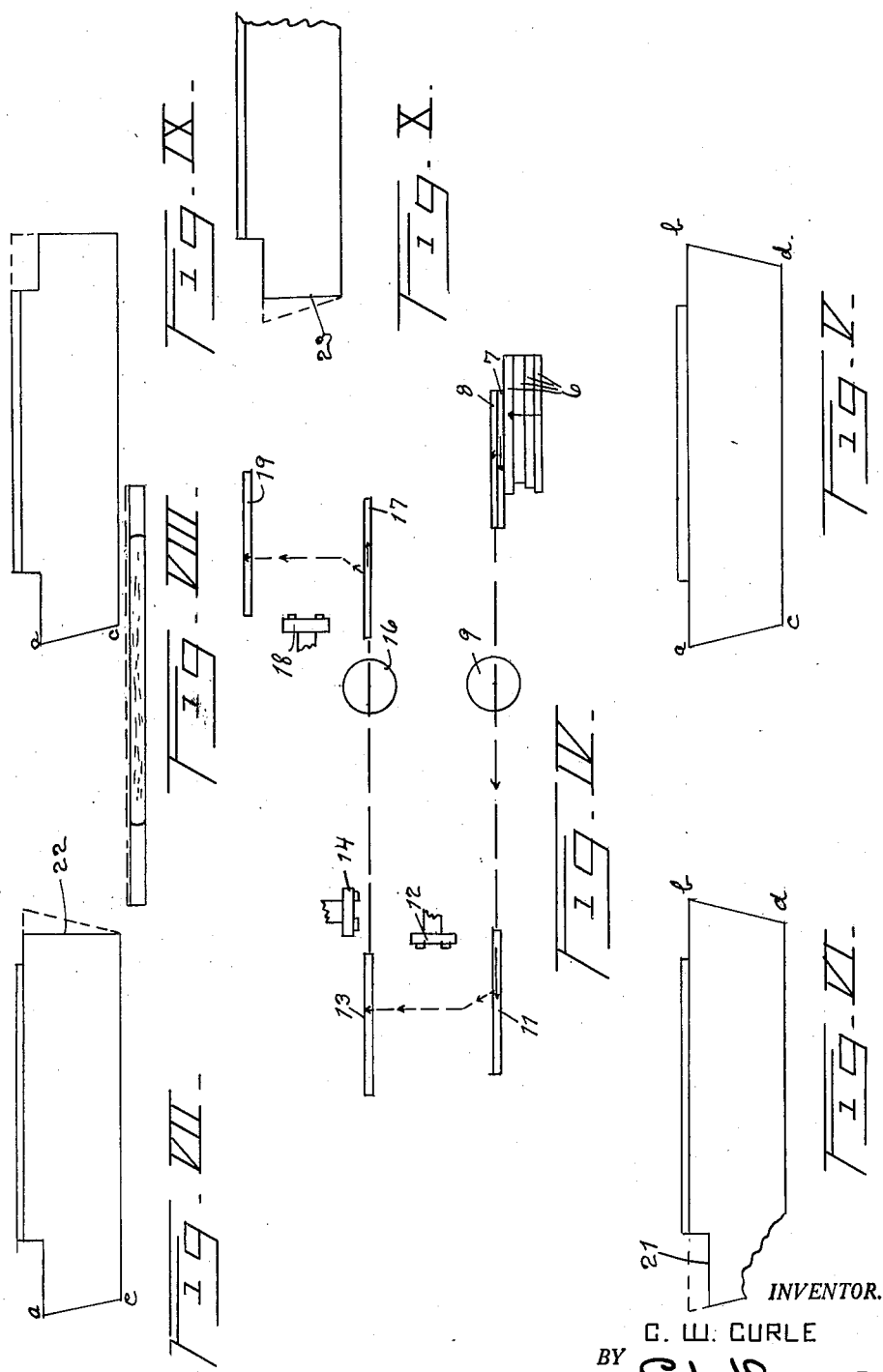

May 23, 1933. C. W. CURLE 1,910,524
TYPE SLUG TRIMMING DEVICE
Filed May 12, 1930 10 Sheets-Sheet 5
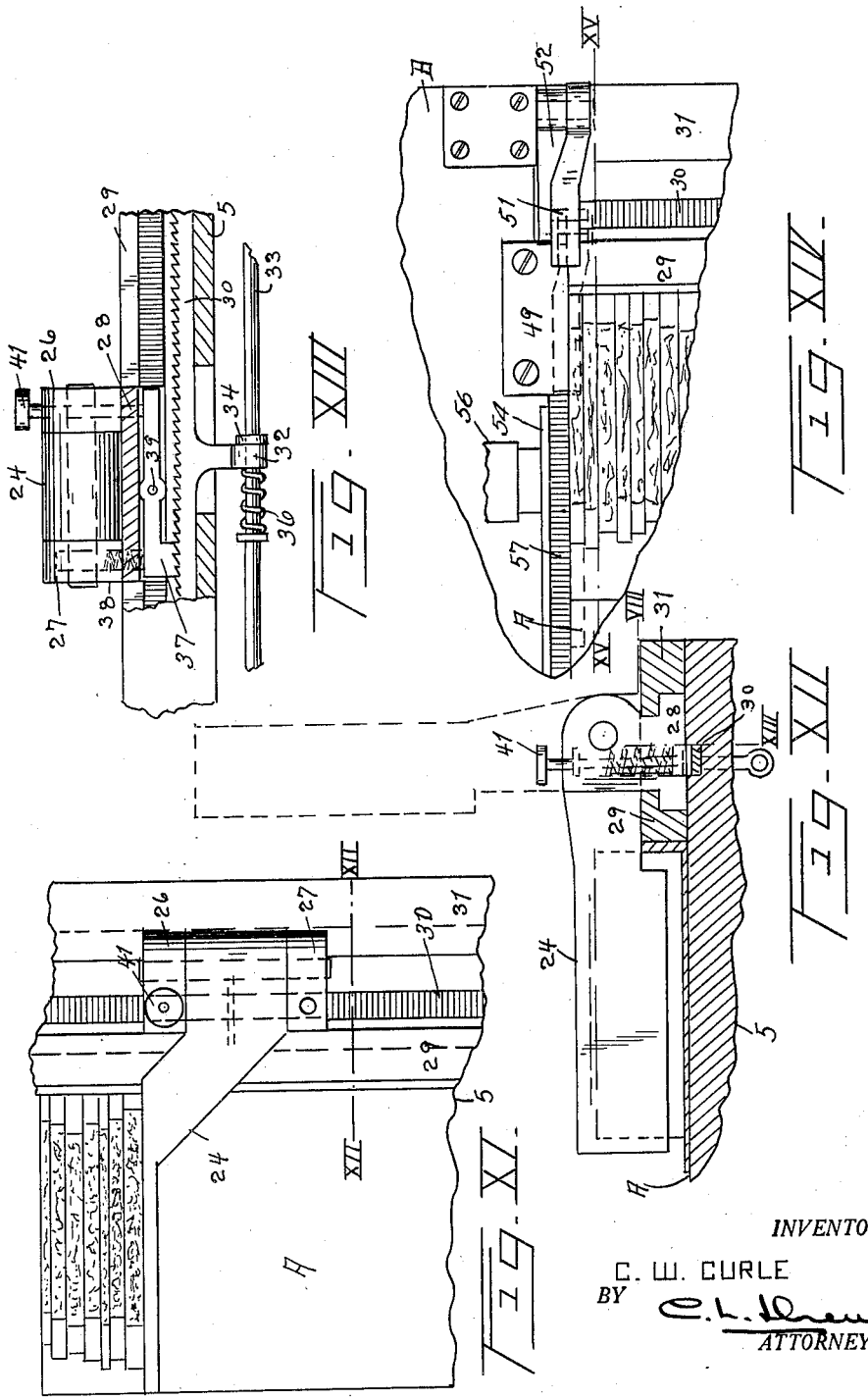
INVENTOR.
C. W. CURLE
BY
ATTORNEY May 23, 1933.  C. W. CURLE  1,910,524
TYPE SLUG TRIMMING DEVICE
Filed May 12, 1930  10 Sheets-Sheet 6
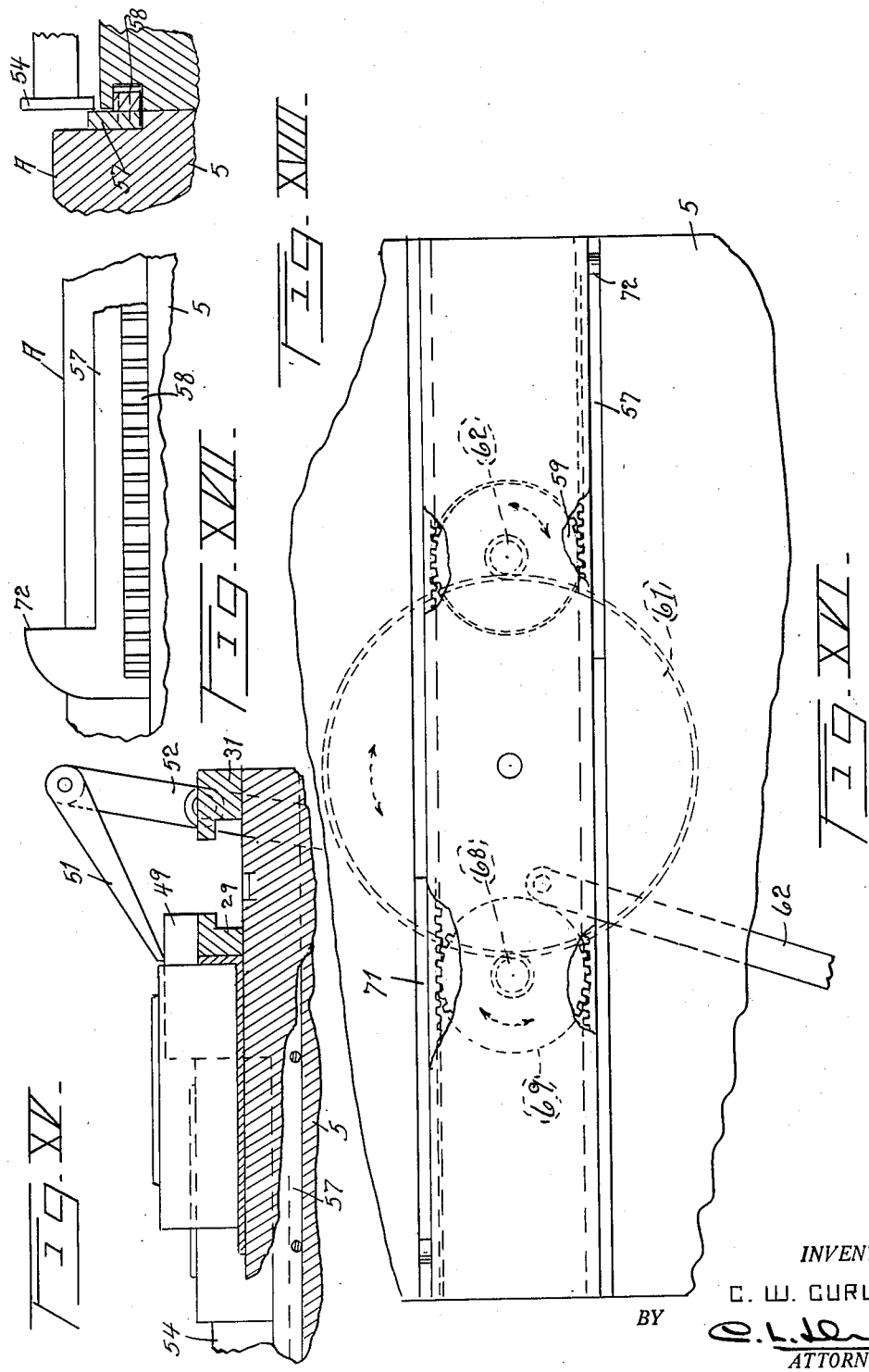
INVENTOR.
C. W. CURLE
BY
ATTORNEY

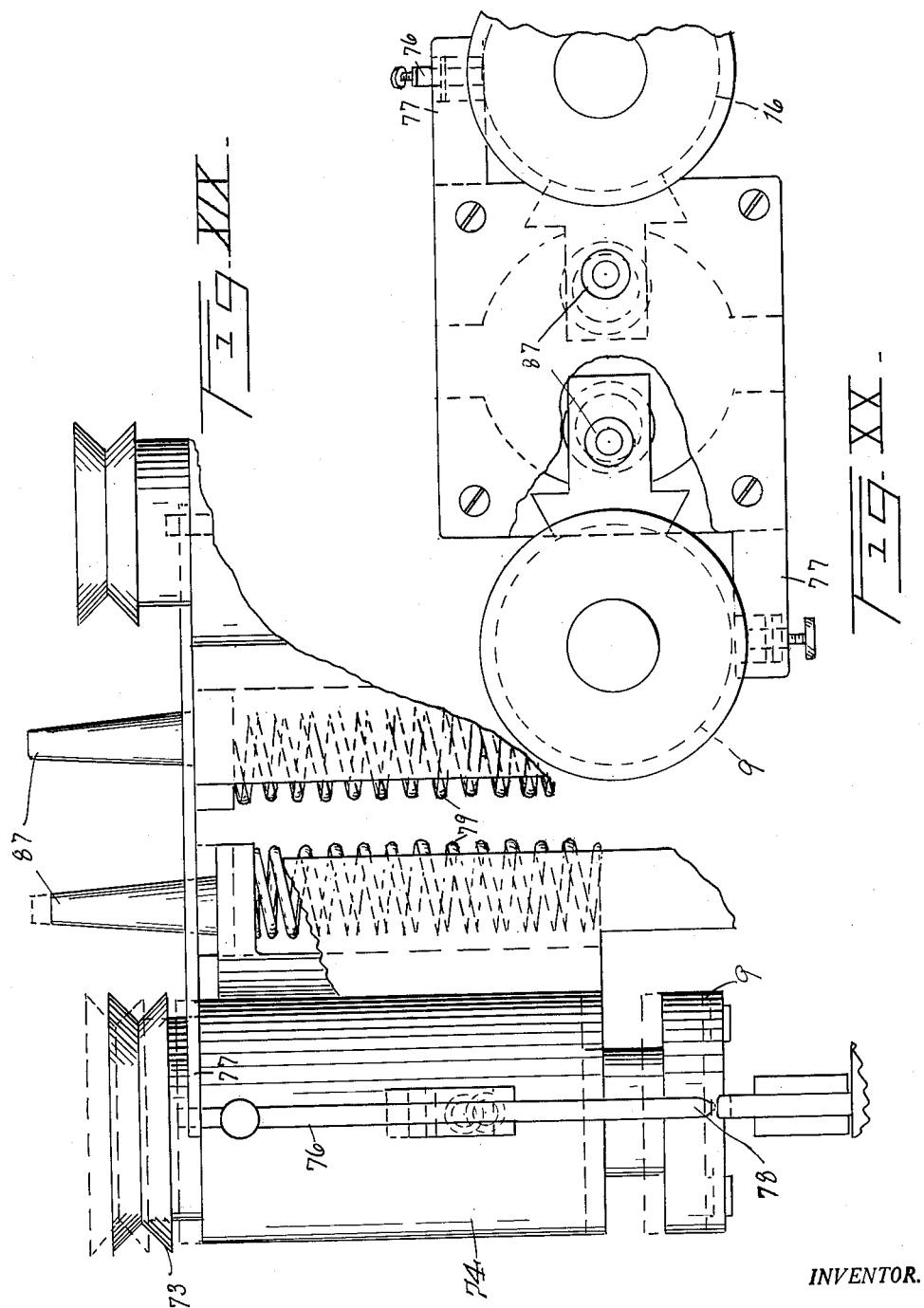

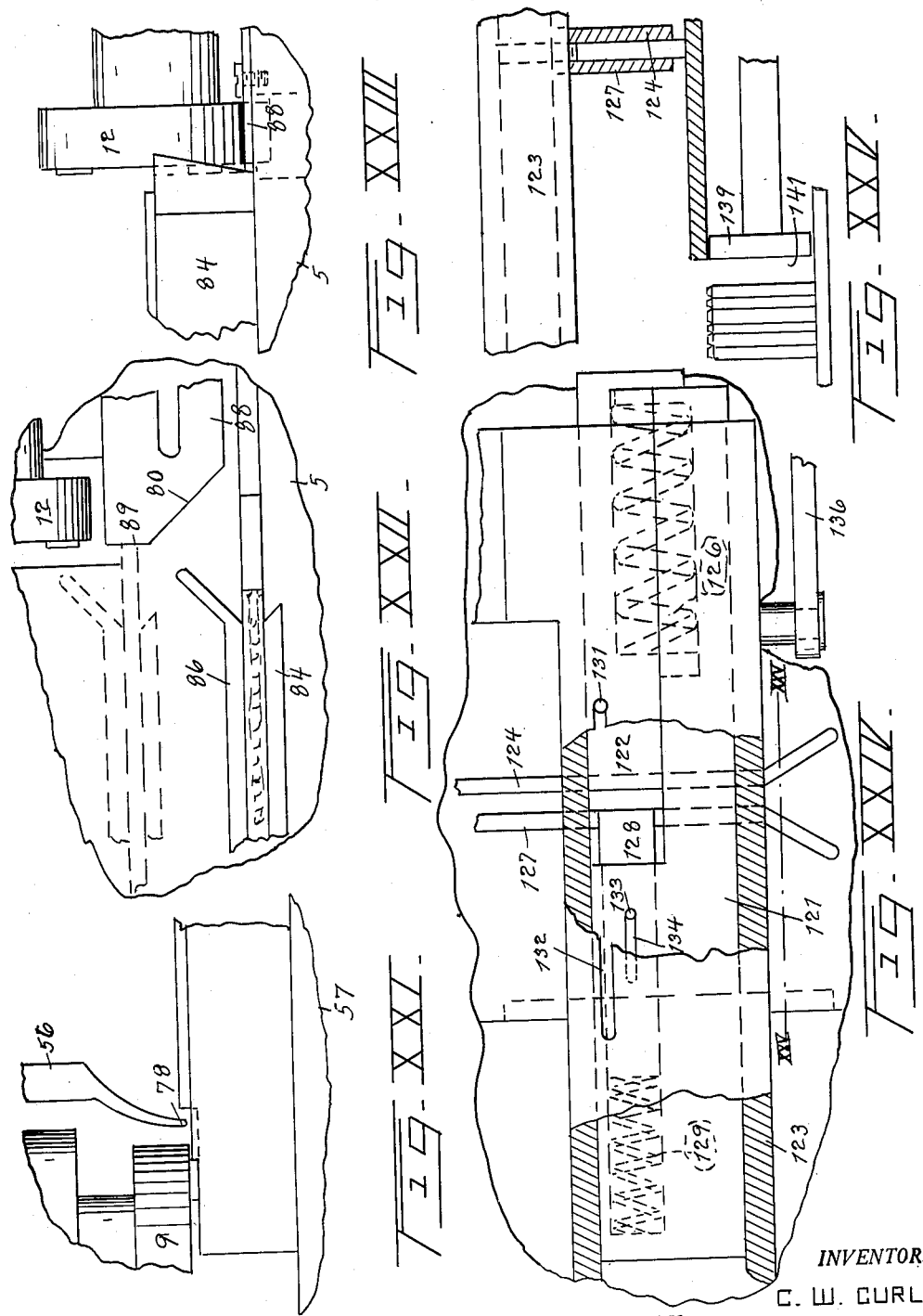

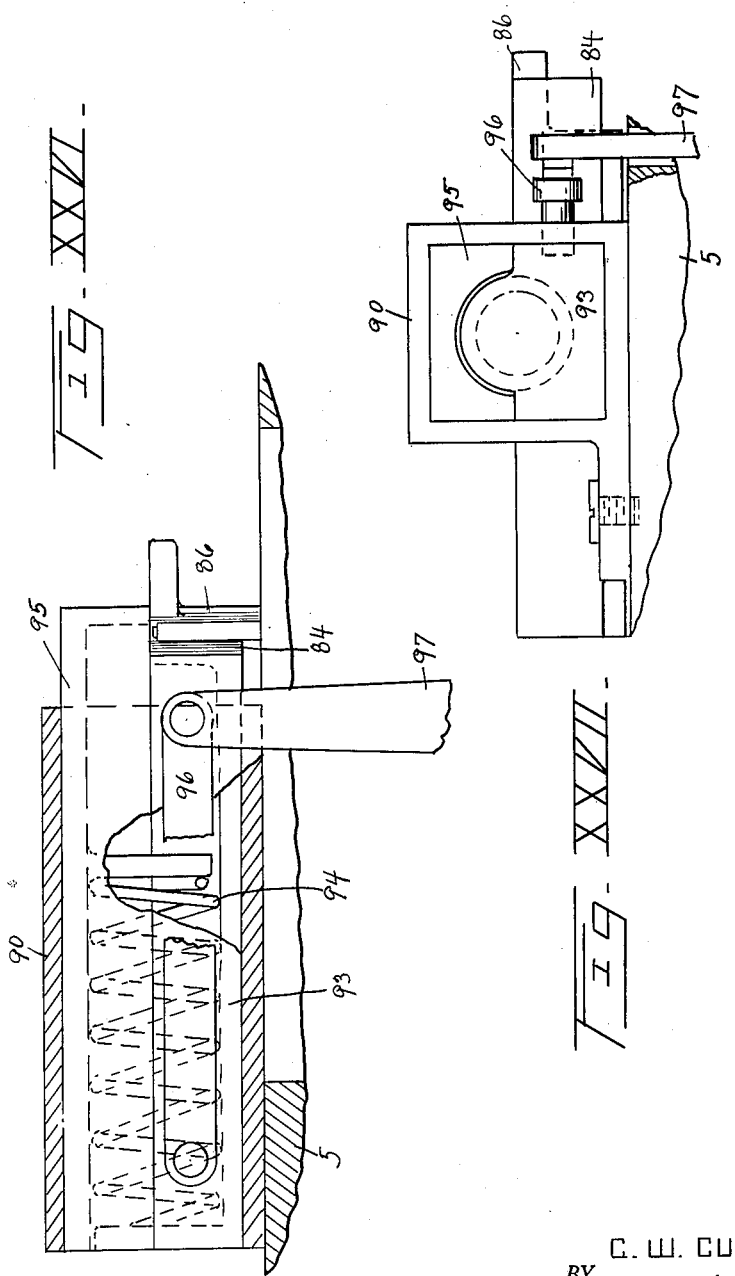

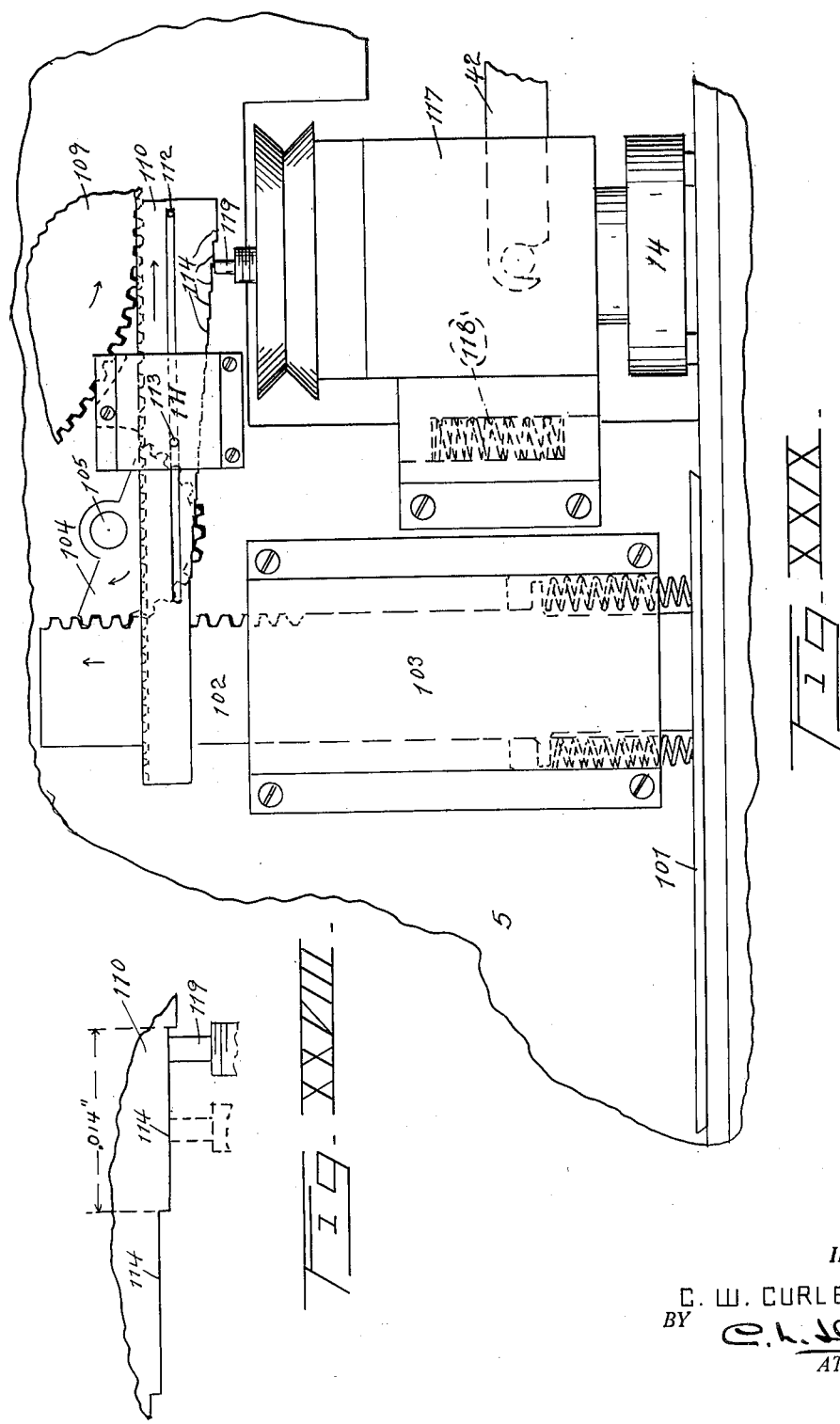

Patented May 23, 1933

1,910,524

UNITED STATES PATENT OFFICE

CHARLES W. CURLE, OF SAN FRANCISCO, CALIFORNIA

TYPE SLUG TRIMMING DEVICE

Application filed May 12, 1930. Serial No. 451,710.

This invention relates to improvements in slug trimming machines and has particular reference to a machine for removing inaccuracies inherent in slugs cast by linotype or intertype type setting machines.

The principal object of this invention is to provide a machine wherein inaccuracies inherent in all casting machines wherein slugs are produced from hot metal may be automatically eliminated from the finished slug.

A further object is to provide a machine whereby slugs may be cast thicker than the regular standard slug, which slug may be reduced to a standard thickness within limits of accuracy unattainable in a casting machine.

A further object is to produce a machine wherein the use of "make ready" is eliminated through the accuracy of the slugs treated.

A further object is to produce a machine wherein the quadded ends of the slug are lowered so as to prevent off set.

A further object is to produce a machine which will handle slugs of any thicknesses and will trim the slugs to standard sizes as to thickness.

A further object is to produce a machine wherein all ends of the slugs will be parallel, thus eliminating the buckling action when the slugs are "locked up" for printing purposes.

Other objects and advantages will be apparent during the course of the following description.

In the accompanying drawings forming a part of this specification, and in which like numerals designate like parts throughout the same, Figure I is a top plan view of my device.

Figure II is a front elevation of Figure I.

Figure III is an end elevation of Figure I, looking from the right of the drawings.

Figure IV is a diagrammatic illustration, showing the movement of the slugs in their travel through the machine.

Figure V is a side elevation of a slug showing the taper of the slug greatly exaggerated.

Figure VI is similar to Figure V and showing in dotted lines that portion of metal removed in the first low slugging operation.

Figure VII is a view similar to Figure VI showing in dotted lines that portion of metal removed in the end trimming operation.

Figure VIII is a top plan view of Figure VII showing in dotted lines the portion of metal removed in the thickness trimming operation.

Figure IX is a view similar to Figure VII showing in dotted lines the metal removed in the second low slugging operation.

Figure X is a fragmentary view similar to Figure IX showing in dotted lines the portion of metal removed in the second end trimming operation.

Figure XI is an enlarged detail top plan view of the slug feed mechanism.

Figure XII is a cross sectional view taken on the line 12—12 of Figure XI.

Figure XIII is a side elevation partly broken away of Figure XI.

Figure XIV is a fragmentary detail view showing the slug selector mechanism.

Figure XV is a cross sectional view taken on the line 15—15 of Figure XIV.

Figure XVI is a fragmentary top plan view of a portion of the supporting stand and showing the operation of the transfer slides.

Figure XVII is a fragmentary side elevation of one of the transfer slides.

Figure XVIII is a fragmentary detail view in cross section of one of the transfer slides.

Figure XIX is a fragmentary side elevation of the low slugging mechanism.

Figure XX is a top plan view of Figure XIX.

Figure XXI is a fragmentary detail view of the trip mechanism for the low slugging cutter head.

Figure XXII is a fragmentary detail view showing the operation of the slug end cutter and gauge.

Figure XXIII is a side elevation of Figure XXII.

Figure XXIV is a top plan view partly broken away of the final delivery grippers.

Figure XXV is a cross sectional view taken on the line 25—25 of Figure XXIV and showing the operation of the stacker.

Figure XXVI is a side elevation partly broken away of the intermediate delivery gripper.

Figure XXVII is an end elevation of Figure XXVI looking from the left of the drawings.

Figure XXVIII is a fragmentary plan view of a portion of the thickness gauge and diagrammatic illustration thereof, and Figure XXIX is a fragmentary top plan view of the thickness gauge and thickness cutter.

In casting slugs from a linotype machine or any similar type casting machine, certain inaccuracies are bound to occur, due to the fact that hot metal is being employed, which hot metal is subject to shrinkage when cool, and further the molds in which the casting is done rapidly warp, due to the heat; therefore, the resulting slug may be several thousandths of an inch out of true, or in other words, in variance to the certain standards set forth by the American Type Founders Association.

Also, due to the fact that these slugs must be forced from a mold, their back edges, meaning the edge opposite the printing face, has a length slightly less than the length of the edge adjacent the printing face, and as a consequence, when these slugs are locked up in a printing frame, there is a tendency for the slugs to buckle upwardly, and it often occurs that, due to the inherent adhesion between the ink on the face of the type and on the paper being printed, the pulling effect when the paper is lifted from the slugs will be sufficient to upset these slugs. In other words, it frequently happens that one or more slugs may be entirely lifted out of the form. This is also partly due to the fact that the inaccuracies in the thicknesses of the slugs, while only being a few thousandths of an inch, are accumulative when the whole locked up form is considered.

These difficulties cause a great deal of time to be lost in the make ready operations incident to printing and often spoil an otherwise perfect job because some of the slugs are higher than others, particularly at the quadded ends, and causing off-set smears. It is also often the case that the molds in the slug casting machine will have to be removed and machined. As this machining is a very exacting operation and can be done only by experts in this line, it means the tying up of a slug casting machine until the mold is sent to the grinder and returned.

With my machine, due to casting from imperfect molds, may be corrected, thus saving the owner of the slug casting machine serious delays.

In the accompanying drawings, wherein for the purpose of illustration is shown a preferred embodiment of my invention, the numeral 5 designates a table like support having three surface levels A, B and C.

The first operation will be the transfer of slugs from a galley placed on the level "A" to the level "B", from which point the various sizing operations will commence.

In order that a clear understanding of the purpose of the machining may be had, by referring to Figure IV it will be noted that a series of slugs are shown at 6, one of which slugs has been moved toward the left as shown at 7. Another of such slugs has been moved forward, as shown at 8. The movement of these slugs is indicated by the arrows thereon.

At 9 is diagrammatically illustrated a low slugging cutter head, under which the slug 8 would have moved to reach the position 11. After reaching the position 11, the slug is moved first diagonally by an end gauge to be later described; thence, transversely past the end cutter 12 until it reaches the position 13.

From this position the slug will be moved endwise past the thickness cutter 14; thence under the second low slugging cutter 16 until it reaches the position 17, from which position the slug will move diagonally and then horizontally past the second end cutter 18 and will finally arrive at the position 19 where it will be deposited in the same relative position to the preceding and succeeding slugs that it occupied when entering my machine.

In Figure V it will be noted that the top of the slug from the points (a) to (b) is longer than the bottom of the slug from the point (c) to the point (d). This fact applies to all of the slugs cast, and in the drawings the portions have been greatly exaggerated in order to better illustrate applicant's invention. In reality, these differences in length are only measured in thousandths of an inch, and while this may appear to be immaterial, it really is of great importance that both ends of the slug be absolutely parallel.

In Figure VI, I have shown in dotted lines a proportion of the slug cut away so as to produce a low slug end 21.

In Figure VII, I have shown the slug as it would appear when it reaches the position 13 of Figure IV. Here, the slug has passed the first end cutter, so as to produce a squared end 22.

In Figure VIII, I show in dotted lines that portion of the slug which will be cut away by the thickness cutter in its movement from the position 13 to a position just previous to passing below the second low slugging cutter 16.

When the slug passes under the second low slugging cutter it will have the appearance of Figure IX, the portion being cut away being shown in dotted line.

In Figure X the final movement of the slug has caused the end 23 to be cut parallel with the end 22 through the action of the second end cutter 18. Thus, it will be seen that as a slug travels through the machine, it is first selected from a group of slugs, then advanced and moved beneath a low slugging cutter, past an end cutter, past a thickness cutter under a second low slugging cutter and past a second end cutter, thus leaving the slug accurately trimmed and low slugged.

In order to advance the slugs through the machine, a feed mechanism is necessary, and by viewing Figure XI, it will be noted that an arm 24, pivoted between a pair of ears 26 and 27 is carried upon a feed slide 28 movable in tracks 29 and 31 mounted upon the raised portion "A" of the table.

In order to advance this slide, a reciprocating rack 30 is positioned between the tracks and is actuated by a downwardly extending arm 32, through which a reciprocating rod 33 passes. This rod has a stop 34 abutting one side of the arm, while a spring 36 abuts the opposite side of the arm.

Movement is transferred from the rack 30 to the slide 28 by a spring pressed ratchet 37 normally held against the reciprocating rack by a spring 38. This ratchet is pivoted at 39 and may be actuated against the tension of the spring by a thumb piece 41. The rod 33 is connected to a rocker arm 42, which rocker arm is fulcrumed beneath the table 5 and receives its timed movement through a link 43 pivotally attached to a lever 44. This lever is fulcrumed so that a roller 46 carried thereby rides on a cam 47.

This cam 47 is mounted upon a shaft 48 carried in the table 5. Therefore, as the shaft 48 is rotated, a certain timed reciprocating motion is transferred to the arm 24 and the slugs which may be in contact therewith are advanced against an abutment 49.

The spring 36 permits reciprocation of the rod 33 a definite amount with each reciprocation irrespective of the amount of movement of the arm 24 and the stop 34 always returns the reciprocating rack to its initial or starting position. Thus, through this arrangement, the amount of forward movement of the arm 24 is controlled entirely by the thickness of the slug being fed into the machine from the abutment 49.

We will now assume that the slugs being advanced by the arm 24 are of varying thicknesses and lengths and have their right hand ends evenly arranged against that side of the galley which lays against the rail 29, and that the first slug is ready to advance into the machine for trimming. By referring to Figures I and XV, it will be noted that the abutment 49 has a pawl 51 riding on the upper surface thereof and extending into alignment with the edge of the first slug being advanced. This pawl 51 is hinged to a lever 52 and normally held by a spring 53 in the position shown in Figure II, the rod 33, in reciprocating, actuates the lever 52 through a suitable bell crank connection 45 so that the advancing slug laying against the abutment 49 will be in position to be picked up by the reciprocation of the pawl and moved toward the left of the drawings, as shown at 7 in Figure IV, where it will clear the abutment and be in a position to drop onto the level B by the next advanced slug. In other words, the movement from the position 7 of Figure IV to the position 8 of Figure IV is an advancing and dropping movement.

In order that the slug may drop freely and yet be held after dropping, a guide member 54 is provided, which is held in a slide bracket 56. See Figs. I and XIV. A spring 50 within this bracket normally holds the guide 54 at a predetermined distance from the side of the elevated portion "A", but just prior to the dropping of the slug there-between, rod 43 connected to the rocker arm 42 pulls the guide backward, so that the space provided is ample for any width of slug.

After the slug has reached the position between the elevated position and the guide, it must be advanced under the first low cutter head, and in order to accomplish this, I provide a transfer slide 57 which moves in a slot formed in the table top and has a rack 58 attached thereto. This rack engages a gear 59 rotatably mounted beneath the table 5 and reciprocated through the action of a large gear 61 meshing with a small gear 62 secured to the gear 59. The large gear 61 is reciprocated through the medium of a link 62, which in turn is reciprocated by a crank arm 60 (see Figures II and III), which crank arm is attached to a shaft 64 rotated by a gear 66 meshing with a gear 67 carried upon the shaft 48.

The large gear 61 also meshes with a second small gear 68, which is attached to a gear 69, which in turn meshes with a second transfer slide 71. The length of the slides 57 and 71 and their attached racks are such that the slide will pass from its engagement with one of the gears to the other of the gears and remain in constant mesh with either one or the other at all times. For instance, the slide 57 may pass from its engagement with the gear 59 into engagement with the gear 69, and in this manner may travel the entire length of the machine. Thus, reciprocating action of the large gear also accomplishes simultaneous movement of the two transfer slides in opposite directions at the same time.

It might be here stated that all feed and transfer operations of the machine may be considered as timed operations and are all driven from the shaft 48. All rotating cutters are independent from the timed operations and are driven by a separate motor.

We will now assume that a slug is resting upon the transfer slide 57 and engaged by the upstanding portion 72, the guide 54 having at this time moved back against the slug so as to hold the same firmly in upright position. Movement of the transfer slide toward the left of the drawing as viewed in Figure I will now move the slug beneath the first low slug cutter 9, to cut the leading end of the slug.

This cutter head is preferably of the revolving type, and is driven by a pulley 73 attached to the spindle carrying the cutter head. This spindle is mounted in a vertically movable bearing 74, which bearing is spring suspended as best illustrated in Figure XIX and is held down in cutting position by a pivoted spring latch 76 mounted upon the bearing, and having its nose adapted to underlie an arm 77 when the cutter and bearing are in cutting position. This latch has a tapered end 78, which is best illustrated in Figure XXI and is adapted to be engaged by the advancing type portion of the slug to be cut just previous to its reaching the cutter head. As a consequence movement of the end 78 causes the latch nose to be moved from beneath the arm 77, the action of the spring 79 will now cause the entire bearing 74 to move upwardly, as shown in dotted lines in Figure XIX, and as a result, the cutter will be out of cutting range when the type portion of the slug passes therebeneath.

The low slugging cutters 9 and 16 are both identical and are both depressed simultaneously by a rocker arm 81 actuated by a link 82 passing thru the table top having a roller 83 riding upon a cam 85 carried upon the shaft 48. This rocker arm 81 has threaded screws 86 which engage with the upper ends of posts 87 carried upon each of the bearings.

Therefore, it will be seen that while each of the low slugging cutters is depressed simultaneously, they are depressed at a time when no slug is passing therebeneath and they are each independently released by the type on the slug passing therebeneath.

Further travel of the slug toward the left causes the slug to enter the intermediate delivery gripper jaws 84 and 86. The movement of the transfer slide 57 is such that the slug does not move entirely into the gripper but extends out a sufficient distance to be in alignment with the beveled end 80 of an adjustable gauge 88. The purpose of the adjustment is to permit the aligning of the gauge and the cutter for the proper end cut. The end 89 of this gauge is in alignment with the cutters of the first end cutter 12, and as a result, as the transfer gripper moves the slug from the position 11 to the position 13 of Figure IV, the slug is also given an endwise movement in the gripper through its engagement with the gauge 88.

As this gauge only contacts the lower or bottom edge of the slug, that is, referring to the side c—d of Figure V, it will be apparent that the end of the slug over-hanging the gauge will be cut by the vertically disposed face of the cutter, as illustrated in Figures VII and XXIII. A similar end gauge is shown at 92 and serves to slide the slug in the same manner for the cutting operation at the opposite end of the slug. As the action in both cases is identical, further reference thereto is unnecessary.

The intermediate transfer gripper consists of a pair of sliding members 95 and 93 adapted to move in the slideway 90 (see Figure XXVI) which members are hollow and have a spring 94 housed there-between and therein. Member 95 carries the gripper 86, while the member 93 carries the gripper 84. The member 93 has pivoted thereto a link 96, which is in turn connected to a lever 97 (see Figures I and II), which carries a roller 100, which rides upon a cam 99 carried upon the shaft 48. The result of this construction is that the spring between the members 92 and 93 permits the grippers 84 and 86 to move apart sufficiently to receive the slug being delivered thereto and when the cam 99 acts on the roller 100 the lever 97 thru the link 96 will move the member 95—93 with their grippers and received slug to the other side of the machine.

We have now moved the slug across the machine and into engagement with a gauge piece 101 carried upon the gauge slide 102. When the slug has reached this position it is overlying the transfer slide 71 and is again ready for endwise movement. Before describing this endwise movement, we will briefly consider the various forms of slugs that are to be received at this point.

A linotype machine is designed to cast twenty-one different thicknesses of slugs, varying by one point steps of from 5 points to 24 points, (printers' gauge) inclusively. Each step represents a difference in thickness of .014 inch. In view of these definite sizes, it will be apparent that it is practically impossible to hold to size slugs cast to these various dimensions, and therefore the slug will vary from end to end, and there will be a difference between the various slugs of supposedly the same thickness. It is to overcome these inaccuracies in thickness that the next operation takes place.

In casting slugs one side of the slug is always known as the plain side while the opposite side is the ribbed side, and it might here be said that in passing slugs through my machine, I employ this plain side as a constant gauge from beginning to end, and therefore all of the gripping means and guides on the ribbed side are spring pressed, which permits the various sizes of slugs to pass through the machine and yet provides a constant or positive gauge for the flat side of each slug.

During the time that the slug is moved from its original position in the intermediate delivery gripper across the machine, the two transfer slides 57 and 71 have been returning to their initial positions so as to be ready to receive new slugs. Thus, this timed operation is such that new slugs are passed through the machine in rapid succession.

The slug, in coming into engagement with the gauge 101, causes the gauge to move in its slide-way 103 a sufficient distance to take care of the greatest thickness of the slug. This endwise movement indicated by the arrow on the slide causes a partial rotation of a segment gear 104, which is attached to a shaft 105 passing through the table top and carrying a gear 106, which in turn meshes with a gear 107, also located beneath the table, which gear is secured to a shaft 108 to which a segment 109 is attached. This segment carries teeth which mesh with a rack formed on the back of the thickness gauge 110. This gauge is slidably held in a slider 111 and rides upon pins 112 and 113. This thickness gauge is provided with a series of stepped gauge surfaces 114. The off-set between each of these surfaces is equal to one standard thickness between various sizes of slugs. Thus, the amount of movement imparted to the gauge 101, depending entirely upon the thickness of the slug pushed thereagainst will determine the amount of movement of the thickness gauge 110, which movement has been multiplied throughout the various gearing between the gauge 101 and the gauge 110.

The thickness cutter 14 is mounted upon a sliding block 117 and is normally held by a spring 118, so that a stop 119 will engage one of the steps on the thickness gauge 110. The rocker arm 42 (see Figure I) has pivotal connection with the sliding block 117, and the timed arrangement is such that the block is moved against the tension of the spring 118; or, in other words, away from the thickness gauge during the period that the thickness gauge is being moved, by a new slug just being positioned. As soon as this movement of the thickness gauge has taken place, the timed action of the rocker arm 42 will be such that the spring 118 may function, to move the stop 119 against whatever step 114 it may be in alignment with.

The slugs in their uncorrected thicknesses may vary from .001 to .004 inch above standard, and the thickness gauge 111 will thus be thrown a little more or less to the right or left, but not so much but what stop 119 will come to bear fairly against the preselected step on gauge 111, as the extra length of those steps allows for a lateral displacement sufficient to care for these anticipated variations. Therefore, the cutter head will be adjusted at each step so that it will cut off any metal in excess of the standard thickness for which the cutter is set by the action of the thickness gauge.

Now, assuming that the transfer slide 71 has moved the slug from its position between the intermediate grippers 84 and 86 and gauge 101, and has passed the same beyond the thickness cutter, another low slugging operation will take place by the second low slugging cutter head 16, and the slug will then be delivered between the final delivery grippers, which consist of sliding members 121 and 122 which are slidable in a slide-way 123. The member 122 carries the gripper 124 and is slidable with respect to the member 121, but held so that the same move in unison during a portion of their travel, through action of a strong spring 126.

The gripper 127 is carried on a slide 128 movable in the member 121 and is spring pressed, as shown at 129. A pin 131 enters the member 122 and slides in a slot 132 formed in the slide-way 123. A pin 133, carried in the slide 128, moves in a slot 134. This final delivery gripper arrangement is actuated through a link 136 connecting with the lever 137 (see Figure I). This lever 137 and the lever 97 move in unison through the action of the roller upon the cam 99, as before mentioned. The result of this transfer construction is that when a slug is delivered between the grippers 124 and 127, the light spring 129 permits the gripper 127 to move away from the gripper 124 and to receive the slug. When the slug is inserted therebetween it is not given a full endwise movement, and therefore when it approaches the end gauge 92 it is moved endwise in the grippers and an end cut is taken therefrom by the cutter 18.

As soon as the slug has reached a position over the depressed portion "C" of the table, pin 131 will strike the far end of the slot 132 and hold the member 122 against the tension of the spring 126. The slide 128 will follow the retracting of the member 122 until its pin 133 engages the end of its slot 132 and hold the member 122 against the tension of the spring 126. The slide 128 will follow the retracting of the member 122 until its pin 133 engages the end of its slot 134, after which time the two grippers will be moved apart through the continued movement of the member 121. At this time the slug held there-between will be dropped onto the surface "C" of the table and into the same relative position that it originally held in the start through the machine.

In order to provide for the next slug to be received, a stacker or pusher 139 is adapted to move forwardly against the slugs and advance them along the depressed surface "C" of the table a sufficient distance to leave a space 141 for the next slug to be delivered this stacker or pusher is connected to the lever 42, as illustrated in Fig. III.

In order to simplify the description, the manner of driving the shaft 48 and of rotating the cutters has been eliminated from the specification. It will merely be necessary to say that the customary reduction gearing is employed for driving the shaft 48, and a continuous belt is provided for rotating all of the cutter heads from a single motor.

It is to be understood that the forms of my invention herewith shown and described, are to be taken as preferred examples of the same and that various changes relative to the shape, size, material and arrangement of parts may be resorted to without departing from the spirit of the invention, or the scope of the subjoined claims.

Having thus described my invention, I claim:—

1. The method of trimming a slug, which consists in advancing the slug in one direction to contact a cutting element, low slugging the slug by contact with the cutting element, thence moving the slug in a direction transverse to its first direction of movement and into engagement with a trimming element to cut one end of said slug, then advancing the slug to contact a trimming element to reduce the thickness of said slug, thence moving said slug in a direction parallel to the first direction of movement, but in an opposite direction thereto, advancing the slug to contact a second low slugging cutting element, and finally advancing the slug in a direction transverse to the last direction of movement to contact a second end cutting element to cut the end parallel to the first cut end.

2. A slug trimming mechanism comprising a pair of depressed low slugging cutters, a trip mechanism associated with each of said cutters whereby when a slug is moved therebeneath, said cutters will be elevated after a pre-determined movement of said slugs therebeneath, a pair of end cutters, gauges positioned adjacent each of said end cutters and means adapted to carry a slug past said gauges and said end cutters, whereby the ends of said slugs will be cut parallel.

3. A slug trimming mechanism comprising a pair of depressed low slugging cutters, a trip mechanism associated with each of said cutters whereby when a slug is passed therebeneath, said cutters will be elevated after a pre-determined movement of said slugs therebeneath, a pair of end cutters, gauges positioned adjacent each of said end cutters, grippers positioned adjacent each of said end cutters and adapted to carry a slug past said gauges and said end cutters, whereby the ends of said slugs will be cut parallel, and a thickness cutter engaging said slugs during their movement there past for trimming said slugs to a standard gauge.

4. A slug trimming mechanism comprising a pair of depressed low slugging cutters, a trip mechanism associated with each of said cutters whereby when a slug is passed therebeneath, said cutters will be elevated after a pre-determined movement of said slugs therebeneath, a pair of end cutters, gauges positioned adjacent each of said end cutters, grippers positioned adjacent each of said end cutters, and adapted to carry a slug past said cutters, and adapted to carry a slug past said gauges and said end cutters, whereby the ends of said slugs will be cut parallel, a thickness cutter engaging said slugs during their movement there past for trimming said slugs to a standard gauge, and gauging mechanism for adjustably positioning said thickness cutter.

5. In a slug trimming mechanism, the combination of a support having an elevated surface and a depressed surface, a pair of reciprocating transfer slides mounted in said support, an intermediate gripper mechanism mounted on said support, means for moving said gripper from a position above one of said slides to a position above the other of said slides, a final delivery gripper positioned above one of said slides, means for moving said delivery gripper from its normal slug receiving position to a position above said depressed portion of said support, a plurality of cutters mounted on said support whereby a slug moved by said transfer slides and said grippers has its ends cut parallel and low slugged in the manner described.

6. In a slug trimming mechanism, a support having an elevated surface and a depressed surface, means for holding a plurality of slugs on said elevated surface, means for separating one of said slugs, a pair of reciprocating transfer slides carried on said support, said slides reciprocating in opposite directions simultaneously, timed mechanism for delivering slugs to said slides, an intermediate gripper normally overlying one of said slides, means for moving said gripper on said support to transfer a slug from one of said slides to the other of said slides, a final delivery gripper, means for reciprocating said final delivery gripper from a point overlying one of said slides to a point above said depressed surface, means for actuating said final delivery gripper to release the slug carried thereby and a cutting mechanism mounted on said support for trimming the ends of said slugs parallel.

7. In a slug trimming mechanism, a support having an elevated surface and a depressed surface, means for holding a plurality of slugs on said elevated surface, means for separating one of said slugs, a pair of reciprocating transfer slides carried on said support, said slides reciprocating in opposite directions simultaneously, timed mechanism for delivering slugs to said slides, an intermediate gripper normally overlying one of said slides, means for moving said gripper on said support to transfer a slug from one of said slides to the other of said slides, a final delivery gripper, means for reciprocating said final delivery gripper from a point overlying one of said slides to a point above said depressed surface, means for actuating said final delivery gripper to release the slug carried thereby, a cutting mechanism mounted on said support for trimming the ends of said slugs parallel, said cutting mechanism comprising a pair of end cutters and gauges positioned adjacent said end cutters, said gauges causing endwise movement to said slug during the movement of the slug past said cutters.

In testimony whereof I affix my signature.

CHARLES W. CURLE.